(12) United States Patent
Xu et al.

(10) Patent No.: US 9,197,027 B2
(45) Date of Patent: Nov. 24, 2015

(54) METHOD FOR MAKING LASER MODULE

(75) Inventors: Qingyang Xu, Hamilton (CA); Yang Lu, Hamilton (CA); Hongping Su, Najing (CN); Xiangyang Li, Nanjing (CN)

(73) Assignees: C2C Link Corporation, Hamilton, Ontario (CA); Nanjing CQ Laser Technologies, Co. Ltd., Nanjing (CN)

( * ) Notice: Subject to any disclaimer, the term of this patent is extended or adjusted under 35 U.S.C. 154(b) by 315 days.

(21) Appl. No.: 13/542,478

(22) Filed: Jul. 5, 2012

(65) Prior Publication Data

US 2014/0011308 A1    Jan. 9, 2014

(51) Int. Cl.
H01S 1/02       (2006.01)
H01S 3/02       (2006.01)
H01S 3/042      (2006.01)
H01S 3/07       (2006.01)
H01S 3/109      (2006.01)
H01S 3/16       (2006.01)

(52) U.S. Cl.
CPC .............. H01S 3/025 (2013.01); H01S 3/042 (2013.01); H01S 3/07 (2013.01); H01S 3/109 (2013.01); H01S 3/1611 (2013.01); H01S 3/1643 (2013.01); H01S 3/1671 (2013.01)

(58) Field of Classification Search
CPC ......... H01S 5/00; H01S 3/0627; H01S 3/025; H01S 3/109; H01S 3/042
See application file for complete search history.

(56) References Cited

U.S. PATENT DOCUMENTS

| | | | |
|---|---|---|---|
| 5,365,539 A | 11/1994 | Mooradian | |
| 5,802,086 A * | 9/1998 | Hargis et al. | 372/22 |
| 5,835,518 A | 11/1998 | Mundinger et al. | |
| 6,259,711 B1 | 7/2001 | Laurell | |
| 7,570,676 B2 | 8/2009 | Essaian et al. | |
| 7,724,797 B2 | 5/2010 | Essaian et al. | |
| 7,742,510 B2 | 6/2010 | Essaian et al. | |
| 8,068,525 B2 | 11/2011 | Yamamoto et al. | |
| 2005/0058174 A1 | 3/2005 | Kadoya | |
| 2005/0063441 A1 | 3/2005 | Brown | |
| 2006/0039436 A1* | 2/2006 | Lei et al. | 372/69 |
| 2007/0121689 A1* | 5/2007 | Brown | 372/39 |

(Continued)

FOREIGN PATENT DOCUMENTS

| | | |
|---|---|---|
| JP | 6462621 | 3/1989 |
| JP | 06188489 A | 7/1994 |

(Continued)

OTHER PUBLICATIONS

Å. Claesson et al., "Diode-pumped miniature lasers using microstructured silicon carriers," Electronics Letters, vol. 36, No. 5, Mar. 2, 2000 (1 pg.).

(Continued)

Primary Examiner — Bac Au
Assistant Examiner — Toniae Thomas
(74) Attorney, Agent, or Firm — Shumaker & Sieffert, P.A.

(57) ABSTRACT

The invention provides a method for making a laser module, comprising: Step 1: fixing a laser crystal and a nonlinear crystal through at least one spacing element to form a first structure; Step 2: assembling the first structure on a substrate; Step 3: removing the spacing element to form a first laser module. According to the invention, the laser crystal and the nonlinear crystal are separately fixed on a heat conductive substrate to form the laser module, thereby the size of the laser module is reduced.

14 Claims, 4 Drawing Sheets

(56) References Cited

U.S. PATENT DOCUMENTS

2007/0133644 A1* 6/2007 Gokay et al. .................... 372/70
2012/0077003 A1* 3/2012 Hu .............................. 428/213

FOREIGN PATENT DOCUMENTS

| JP | 07258000 A | 10/1995 |
| JP | 10256638 A | 9/1998 |
| JP | 2005285812 A | 10/2005 |
| JP | 2007121515 A | 5/2007 |
| WO | 2011140641 A1 | 11/2011 |

OTHER PUBLICATIONS

S.T. Lin et al., "Broadband Fiber-Laser-Pumped CW OPO for Red, Green, Blue Laser Generation," CLEO, Pacific Rim 2009, Shanghai, China, Aug. 31-Sep. 3, 2009 (1 pg.).

Zhou et al., "52% optical-to-optical conversion efficiency in a compact 1.5W 532 nm second harmonic generation laser with intracavity periodically-poled MgO:LiNbO3," Laser Physics, vol. 20, No. 7, pp. 1568-1571 (2010).

Qi, et al., "High Power green laser with PPMgLN intracavity doubled," CLEO/Pacific Rim '09, pp. 1-2, Aug. 31-Sep. 3, 2009.

* cited by examiner

METHOD FOR MAKING LASER MODULE

TECHNICAL FIELD OF THE INVENTION

The invention relates to the field of laser technique, and more specifically to a method for making a laser module.

BACKGROUND OF THE INVENTION

Recently, the laser display has been used more and more extensively (for example, it could be applied to the miniature projection device embedded in mobile phones, portable projects and laser TVs or the like). In the field of laser display, a discrete laser device with three base colors of Red, Green and Blue (RGB), which is low cost, small size, high efficiency and high power, is required urgently. Although the red and blue semiconductor laser diode can meet the cost/performance requirement of laser display, the green semiconductor laser diode cannot meet the requirement.

According to different types of projectors, the green laser needs a power of 100 mW to several watts. However, the green laser emitted from the current Diode Pumped Solid-state Laser (DPSSL) cannot meet the requirements of all laser display devices. For example, the DPSSL based on the optically contacted Neodymium doped Yttrium Orthovanadate ($Nd:YVO_4$) and Potassium Titanyl Phosphate (KTP) can only generate green laser of less than 100 mW. Although the DPSSL made by separate $Nd:YVO_4$ and KTP can generate green laser of more than 1 W, the requirement on strict size and cost cannot be met. The portable laser projector urgently needs a green laser which has the power of 300-1000 mW, high efficiency and small size.

By comparison with the KTP and Lithium Triborate (LBO) crystal in the prior art, the MgO doped Periodically Poled Lithium Niobate (MgO:PPLN) can generate green laser efficiently. Using 20 W 808 nm laser diode pump to generate green laser of 6 W has been recorded (Please refer to Y. Qi, et al., "High Power green laser with PPMgLN intracavity doubled," CLEO/Pacific Rim '09, pp. 1-2, 2009), the MgO:PPLN crystal can also be used to achieve higher conversion efficiency (52%) (Refer to M. Zhou, et al., "52% optical-to-optical conversion efficiency in a compact 1.5 W 532 nm second harmonic generation laser with intracavity periodically-poled $MgO:LiNbO_3$," Laser Physics, vol. 20, no. 7, pp. 568-1571, 2010). However, these efficient discrete DPSS green lasers are achieved with a complicated packaging structure, for example, the components, such as laser diode, focusing lens, laser crystal (for example $Nd:YVO_4$), nonlinear crystal (for example MgO:PPLN, KTP or LBO etc.) and output coupler and so on, have to be used in laser package. Therefore, it is impossible to massively manufacture so complex green laser devices. Furthermore, the discrete DPSS laser for generating green laser has a larger size, so it is not suitable for the field of laser display.

On the other hand, to generate green laser by means of optical contacted DPSSL is a mature technology, and has been reported in many literatures. For example, U.S. Pat. No. 5,365,539, Feb. 9, 1989. Moravian, et al., "Microchip laser"; U.S. Pat. No. 6,259,711, Jul. 10, 2001, F. Laurell, "Laser"; U.S. Pat. No. 7,742,510B2, Jun. 22, 2010, S. Essian, "Compact solid-state laser with nonlinear frequency conversion using periodically poled materials"; U.S. Pat. No. 7,570,676, Aug. 4, 2009, S. Essian, et al., "Compact efficient and robust ultraviolet solid-state laser sources based on nonlinear frequency conversion in periodically poled materials"; US patent application 2005/0,063,44100, D. C. Brown, "High-density methods for producing diode-pumped microlasers" etc. However, since the optical bonded interface has a low damage threshold, the output power of the green laser is also low. In order to overcome the problem of high power operation, Essian applied a microchip array structure (Please refer to U.S. Pat. No. 7,724,797B2, May 25, 2010, S. Essian, "Solid-state laser arrays using nonlinear frequency conversion using periodically poled materials"). Additionally, Yamamoto disclosed a planar waveguide DPSSL green laser structure (Please refer to U.S. Pat. No. 8,068,525, Nov. 29, 2011, S. Yamamoto, et. al., "Solid-state laser element"), wherein in order to scale up the power, the planar waveguide $Nd:YVO_4$/PPMgLN array is used. However, the beam array re-shaped thereafter is very complicated.

SUMMARY OF THE INVENTION

The purpose of the invention is to provide a method for making a laser module to solve the problem that the laser module in the prior art is large in size.

In order to solve the above technical problem, according to one aspect of the invention, there is provided a method for making a laser module, the method comprises: Step 1: fixing a laser crystal and a nonlinear crystal through at least one spacing element to form a first structure; Step 2: assembling the first structure on a substrate; Step 3: removing the spacing element to form a first laser module.

Further, in the Step 1, the spacing element is connected with the laser crystal and/or the nonlinear crystal through optical bonding or glue bonding.

Further, in the Step 2, the first structure is connected with the substrate through bonding or welding.

Further, the substrate is a heat conductive substrate.

Further, the nonlinear crystal is magnesium oxide doped PPLN, PPLT, PPSLT, PPKTP, KTP, BBO, BIBO or LBO.

Further, the nonlinear crystal is doped with magnesium oxide with molar concentration of 5%.

Further, the laser crystal is neodymium doped yttrium orthovanadate, neodymium doped gadolinium orthovanadate or neodymium doped yttrium aluminium garnet.

Further, the laser crystal is doped with $Nd^{3+}$ ion with doping concentration of 1-3%.

Further, the doping concentration of $Nd^{3+}$ ion in the laser crystal is 1%, 2% or 3%.

Further, the length of the laser crystal is 0.5-5 mm, the length of the nonlinear crystal is 0.5-5 mm, there is a gap between the laser crystal and the nonlinear crystal, and the length of the gap is 0.2-8 mm.

Further, there is a gap between the laser crystal and the nonlinear crystal; if the power of the laser module is 100-150 mW, then the length of the laser crystal is 0.5-2 mm, the laser crystal is doped with $Nd^{3+}$ ion with doping concentration of 3%, the length of the nonlinear crystal is 0.5-5 mm, and the length of the gap is 0.2-2 mm; if the power of the laser module is 100-500 mW, then the length of the laser crystal is 1-3 mm, the laser crystal is doped with $Nd^{3+}$ ion with doping concentration of 2%, the length of the nonlinear crystal is 0.5-5 mm, and the length of the gap is 1-3 mm; if the power of the laser module is 300-1000 mW, then the length of the laser crystal is 2-3 mm, the laser crystal is doped with $Nd^{3+}$ ion with doping concentration of 1%, the length of the nonlinear crystal is 0.5-5 mm, and the length of the gap is 2-7 mm; if the power of the laser module is 1000-5000 mW, then the length of the laser crystal is 3-5 mm, the laser crystal is doped with $Nd^{3+}$ ion with doping concentration of 0.5%, the length of the nonlinear crystal is 0.5-5 mm, and the length of the gap is 3-8 mm.

Further, the spacing element comprises two parallel bonded surfaces, the laser crystal and the nonlinear crystal are respectively connected with one of the bonded surfaces so that the input surface and the output surface of the laser crystal and the nonlinear crystal are parallel to each other and vertical to the direction of a laser beam.

Further, the method further comprises Step 4 after the Step 3: combining a plurality of first laser modules into an array, and packaging the nonlinear crystal of each first laser module of the array in a metal holder.

Further, the array is formed by stacking each first laser module in a direction vertical to an optical axis thereof.

According to the invention, the laser crystal and the nonlinear crystal are separately fixed on a heat conductive substrate to form the laser module, thereby the size of the laser module is reduced.

BRIEF DESCRIPTION OF THE DRAWINGS

The accompanying drawings constituting a part of the application are included to provide a further understanding of the invention. The schematic embodiments and description thereof of the invention are intended to explain the invention, and do not constitute improper restriction to the invention. In the drawings.

The designators in these figures: 10 first laser module; 11 laser crystal; 12 nonlinear crystal; 13 spacing element; 14 dicing line; 15 substrate; 16 bonding layer; 20 metal holder; 30 array; 40 metal housing.

DETAILED DESCRIPTION OF THE INVENTION

The embodiments of the invention will be described in detail below in conjunction with accompanying drawings. But the invention can be implemented in various ways defined and covered by claims.

Figure 1:
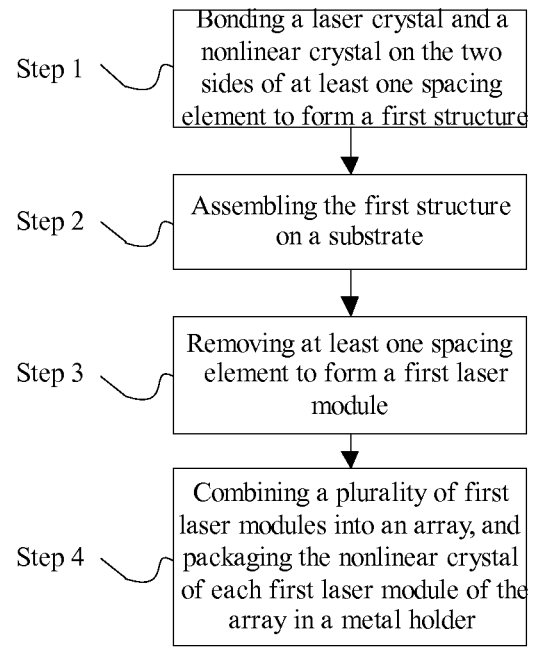
FIG. 1 schematically illustrates a flow chart of a method for making a laser module in the invention.

The invention provides a method for making a laser module. As shown in FIG. 1, the making method comprises:

Step 1: Fixing a laser crystal 11 and a nonlinear crystal 12 through at least one spacing element 13 to form a first structure. Specifically, the spacing element 13 may be connected with the laser crystal 11 and/or the nonlinear crystal 12 through optical bonding or glue bonding. Preferably, the spacing element 13 comprises two parallel bonded surfaces, the laser crystal 11 and the nonlinear crystal 12 are respectively connected with one of the bonded surfaces so that the input surface and the output surface of the laser crystal 11 and the nonlinear crystal 12 are parallel to each other and vertical to the direction of a laser beam.

Figure 2:
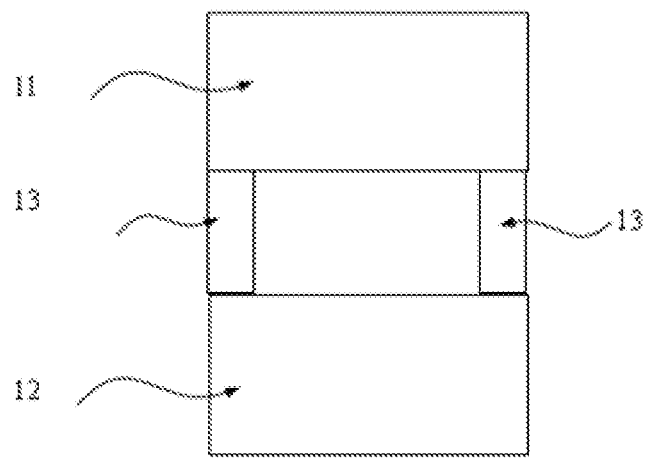
FIG. 2 schematically illustrates a schematic diagram of one embodiment in which a substrate is not installed in the invention.

As shown in FIG. 2, the laser crystal 11 and the nonlinear crystal 12 are arranged on the same side of the substrate 15, and there is a gap between the laser crystal 11 and the nonlinear crystal 12. In the embodiment shown in FIG. 2, two identical spacing elements 13 are adopted, and the spacing elements 13 are arranged on the two end parts of the strip-shaped laser crystal 11 and nonlinear crystal 12. In the embodiment shown in FIG. 3, one spacing element 13 is adopted, and the spacing element 13 is located in the middle part of the strip-shaped laser crystal 11 and nonlinear crystal 12.

In this step, the laser crystal 11, the nonlinear crystal 12 and the spacing element 13 need to be aligned carefully, so that all surfaces of the laser crystal 11 and the nonlinear crystal 12 vertical to the laser beam are in a parallel state to form a high quality laser cavity. Preferably, the spacing element 13 can be made from any optical materials easy to be manufactured, such as silicon, silica, or lithium niobate or the like.

As a preferred embodiment, the laser crystal 11 is doped with $Nd^{3+}$ ion with doping concentration of 1-3%. Particularly, the laser crystal 11 is Neodymium doped Yttrium Orthovanadate ($Nd:YVO_4$), Neodymium Doped Gadolinium Orthovanadate ($Nd:GdVO_4$), or Neodymium Doped Yttrium Aluminium Garnet (Nd:YAG). Further, the doping concentration of $Nd^{3+}$ ion in the laser crystal 11 is 1%, 2% or 3%. Additionally, the concentration of $Nd^{3+}$ ion can be determined according to different power (for example the power of green laser), for example, the concentration of $Nd^{3+}$ ion in the laser crystal 11 may be 1%, 2% and 3% respectively in the event that the power of the laser module is 100-150 mW, 100-500 mW and 300-1000 mW.

In a preferred embodiment, the nonlinear crystal 12 is doped with magnesium oxide with molar concentration of 5%. Particularly, the nonlinear crystal 12 is MgO doped Periodically Poled Lithium Niobate (MgO:PPLN), Periodically Poled Lithium Tantalate (PPLT), Periodically Poled Near-stoichiometric Lithium Tantalate (PPSLT), Periodically Poled Potassium Titanyl Phosphate (PPKTP), Potassium Titanyl Phosphate (KTP), Beta Barium Borate (BBO), Bismuth Borate (BIBO) or Lithium Triborate (LBO).

It should be noted that, in the invention, the laser crystal 11 and the nonlinear crystal 12 of different materials may be combined to obtain different kinds of laser module. Additionally, the concentration of $Nd^{3+}$ ion in the laser crystal 11 and the concentration of the magnesium oxide in the nonlinear crystal 12 may also be determined and combined according to the need. Furthermore, the substance doped in the laser crystal 11 and the nonlinear crystal 12 is not limited to $Nd^{3+}$ ion and magnesium oxide, also may be other substance commonly used by those skilled in the art.

Step 2: Assembling the first structure on a substrate 15. Preferably, the substrate 15 is made from heat conductive material. Preferably, the heat conductive material may be silicon, sapphire or metal (for example copper, aluminium etc.) or the like. The first structure may be connected with the substrate 15 through bonding or welding, also by other ways known in the art. After the first structure is fixed on the substrate 15, all the surfaces above-mentioned should be in a parallel state (particularly, the parallelism of each surface of the laser crystal 11 and the nonlinear crystal 12 is within 10 seconds).

Figure 5:
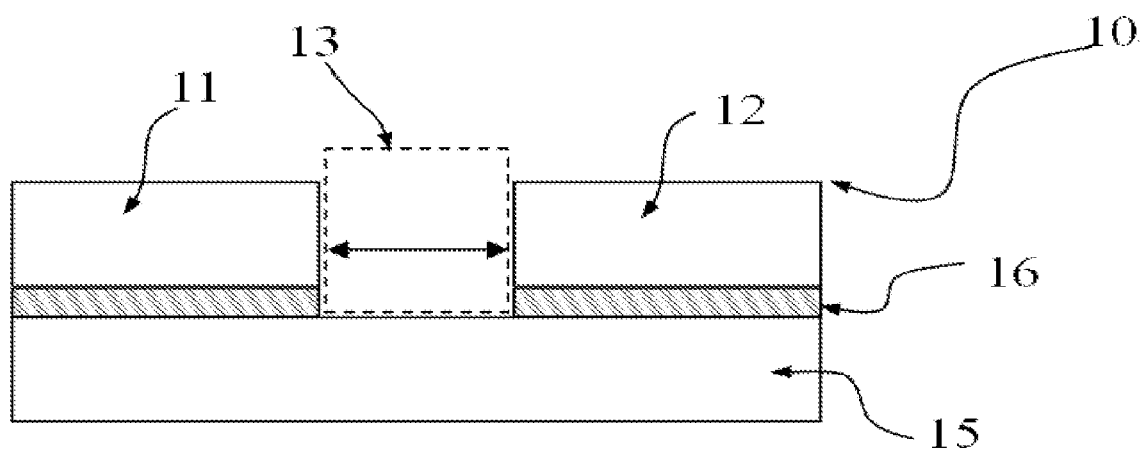
FIG. 5 schematically illustrates a structure diagram of a laser module in which the substrate is installed.
Figure 6:
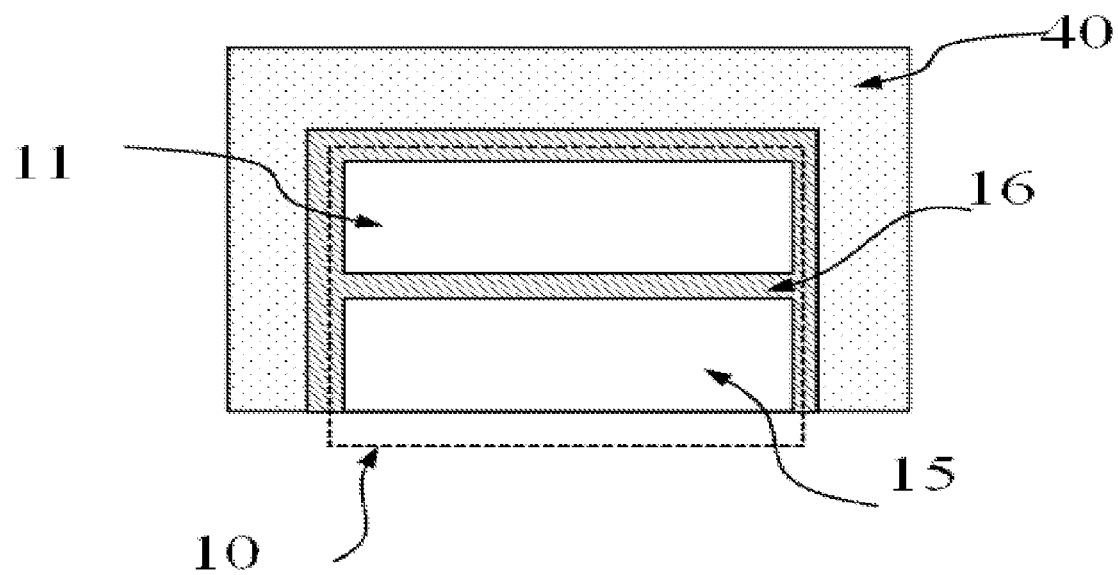
FIG. 6 schematically illustrates a structure diagram of a laser module in which a metal housing is installed.

As shown in FIGS. 5-6, the laser crystal 11 and the nonlinear crystal 12 are connected with the substrate 15 through a bonding layer 16. The bonding layer 16 may be any heat conductive glue or low temperature metal welding layer. For example, the heat conductive glue may be silicon resin, light epoxy resin or silver colloid or the like. When the low temperature metal welding layer is adopted, the surfaces of the laser crystal 11 and the nonlinear crystal 12 need to be metalized beforehand.

Step 3: Removing at least one spacing element 13 to form a first laser module. After the spacing element 13 is removed, the laser crystal 11 and the nonlinear crystal 12 are fixed on the substrate 15 so as to form the first laser module. Due to the removal of the spacing element 13, a gap is formed at the position of the spacing element 13, and the laser crystal 11 and the nonlinear crystal 12 are separated by the gap.

Figure 3:
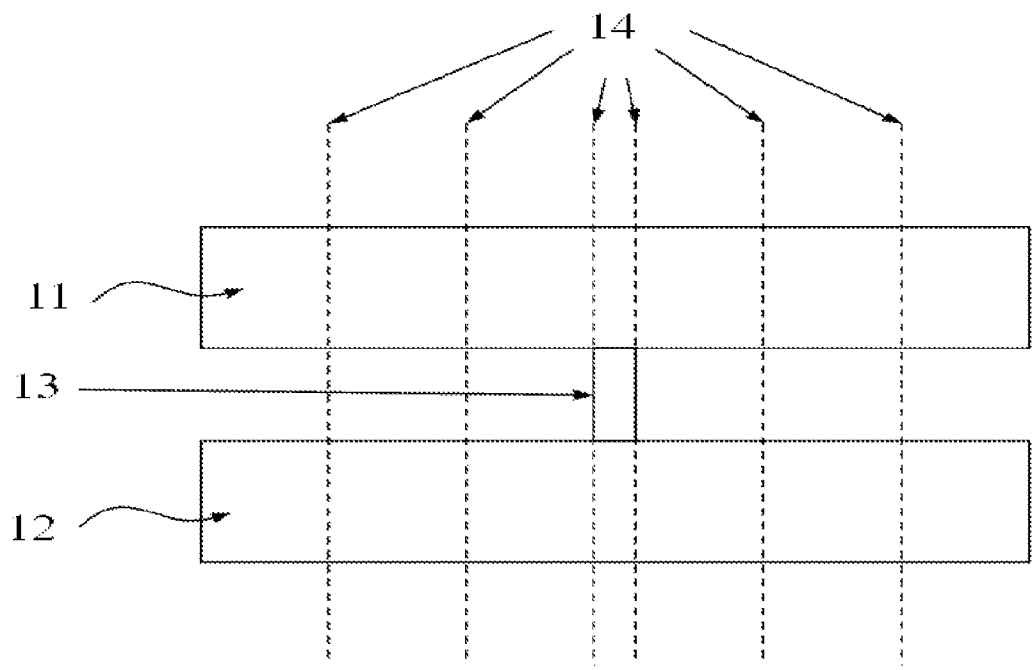
FIG. 3 schematically illustrates a schematic diagram of another embodiment in which a substrate is not installed in the invention.
Figure 4:
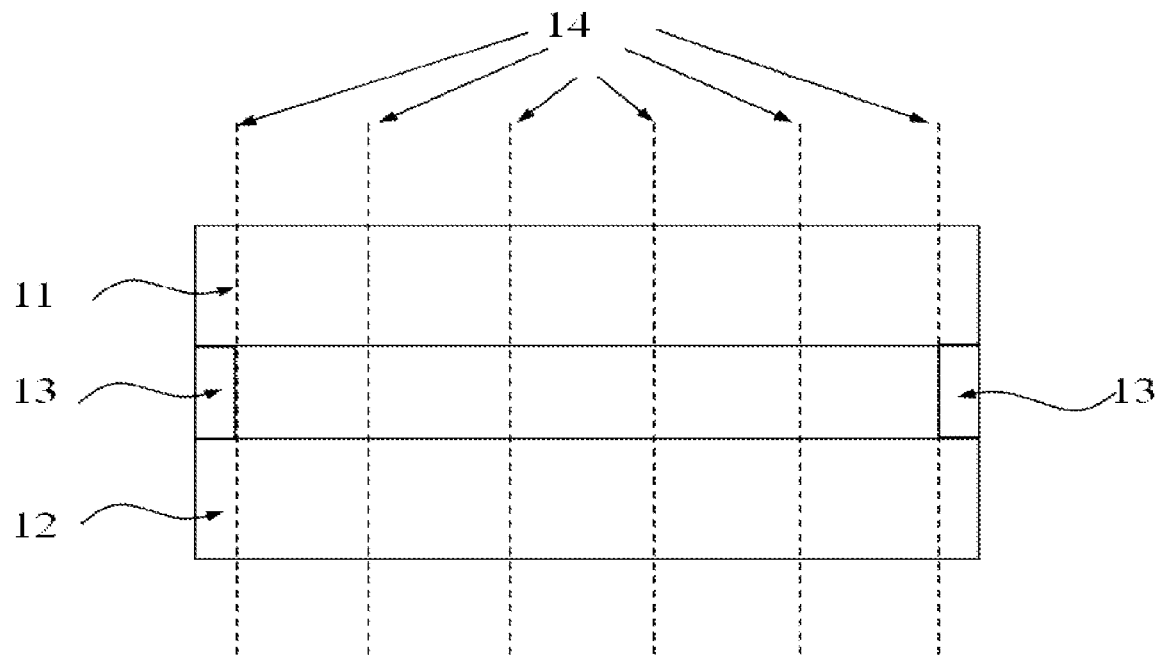
FIG. 4 schematically illustrates a dicing diagram of the embodiment illustrated in FIG. 2.

Please refer to FIGS. 3-4, the Step 3 further comprises: removing at least one spacing element 13 by dicing. At this moment, the strip-shaped laser crystal 11 and nonlinear crystal 12 are used to manufacture the laser module of the invention. After the laser crystal 11, the nonlinear crystal 12 and the spacing element 13 are fixed on the substrate 15, the part where the spacing element 13 is located may be diced in a dicing manner to form one or more laser modules.

Particularly, in the embodiment shown in FIG. 6, the first laser module 10 is packaged in a metal housing 40 to improve heat dissipation. The metal housing 40 may also protect the gap between the laser crystal 11 and the nonlinear crystal 12. The metal housing 40 may be made of copper, brass or aluminium or the like.

Step 4: Combining a plurality of first laser modules 10 into an array 30, and packaging the nonlinear crystal 12 of each first laser module 10 of the array (30) in a metal holder 20 (Please refer to FIG. 7 and FIG. 8). In such a way, on one hand, it may be compatible with the transverse polarization direction of a pumping laser diode, on the other hand it may scale up the power.

Figure 7:
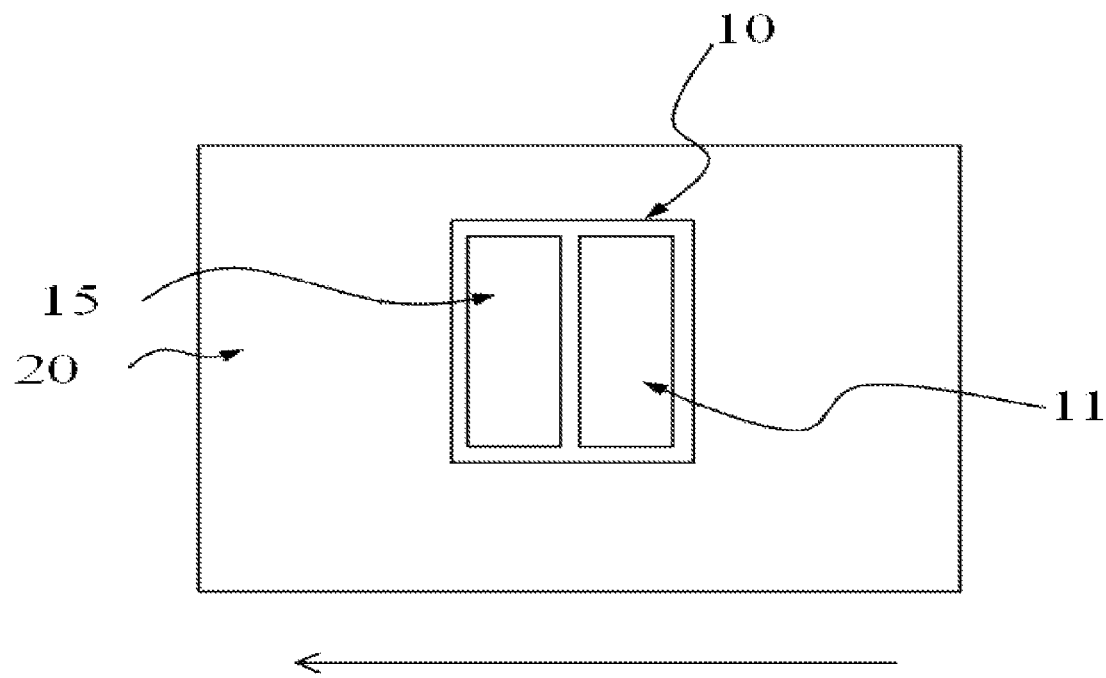
FIG. 7 schematically illustrates a schematic diagram of a laser module array in one embodiment.
Figure 8:
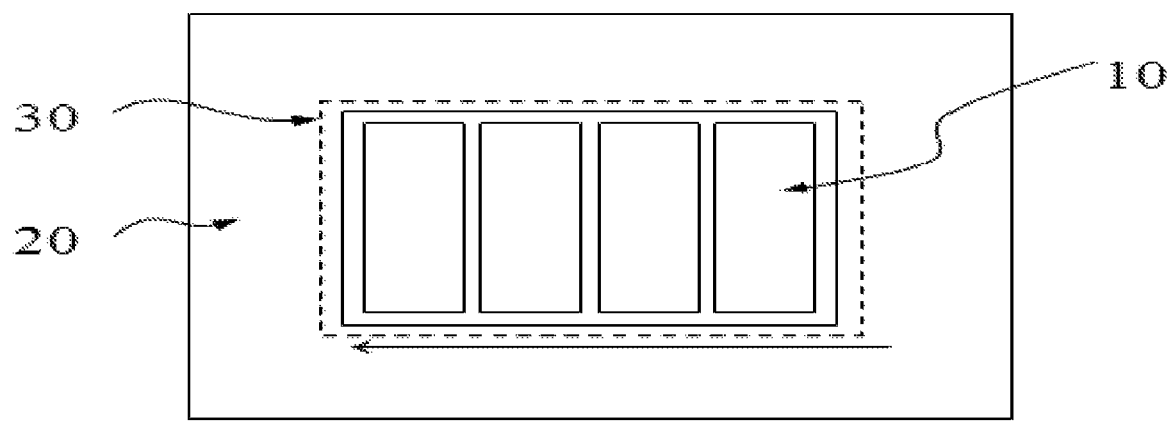
FIG. 8 schematically illustrates a schematic diagram of a laser module array in another embodiment.

As shown in FIG. 7 and FIG. 8, at least one nonlinear crystal 12 of the first laser module 10 may be packaged in the metal holder 20 in order to be compatible with the transverse polarization direction of the pumping laser diode. In FIG. 7 and FIG. 8, the first laser module 10 has an optical axis in horizontal direction indicated by arrow, this arrangement may keep compatible with the transverse polarization direction of the laser diode (for example a semiconductor laser of 808 nm) for pumping the laser module.

Please refer to FIG. 8, the array 30 is formed by stacking each first laser module 10 in a direction vertical to an optical axis thereof. For example, the centre distance of the pumping laser diode is 500 microns. Correspondingly, the spacing between each laser module in FIG. 8 is also 500 microns. By stacking, the green laser with power up to 10 W may be generated.

In a preferred embodiment, prior to the Step 1, the method also comprises the step of preparing the laser crystal 11, the nonlinear crystal 12 and the spacing element 13. Specifically, the step comprises polishing, coating and cleaning the surfaces of the laser crystal 11, the nonlinear crystal 12 and the spacing element 13.

Preferably, the input surface of the laser crystal 11 is coated with high transmission film (preferably, the high transmission film is applied to the laser with a wavelength of 808 nm) and high-reflection film (preferably, the high-reflection film is applied to the laser with a wavelength of 106 nm); the output surface of the laser crystal 11 is coated with anti-reflection film (preferably, the anti-reflection film is applied to the laser with a wavelength of 1064 nm) and high-reflection film (preferably, the high-reflection film is applied to the laser with a wavelength of 532 nm). Further, the input surface of the nonlinear crystal 12 is coated with anti-reflection film (preferably, the anti-reflection film is applied to the laser with wavelengths of 1064 nm and 532 nm), the output surface of the nonlinear crystal 12 is coated with high-reflection film (preferably, the high-reflection film is applied to the laser with a wavelength of 1064 nm) and an high transmission film (preferably, the high transmission film is applied to the laser with a wavelength of 532 nm).

Due to thermal lensing effect, the plano-parallel cavity structure is essentially equivalent to the concave-plano cavity structure. In order to obtain the laser of higher power, it is necessary to optimize the length of the cavity. Therefore, in order to ensure that the laser module in the invention has higher power (e.g., 300-1000 mW), it is necessary to optimize the length of the cavity. The length of the cavity of the laser module in the invention may be controlled by the lengths of the laser crystal 11 and the nonlinear crystal 12, and the length of the gap between the laser crystal 11 and the nonlinear crystal 12. In a preferred embodiment, the length of the laser crystal 11 is 0.5-5 mm, the length of the nonlinear crystal 12 is 0.5-3 mm, the length of the gap is 0.2-8 mm, in such a way the length of the cavity is controlled between 1.2 mm and 1.6 mm.

For example, if the power of the laser module is 100-150 mW, then the length of the laser crystal 11 is 0.5-2 mm (particularly, the length may be 0.5 mm, 1 mm and 1.5 mm), the length of the gap is 0.2-2 mm (particularly, the length may be 0.5 mm, 1 mm and 1.5 mm), and particularly, the laser crystal 11 may be doped with $Nd^{3+}$ ion with doping concentration of 3%.

If the power of the laser module is 100-500 mW, then the length of the laser crystal 11 is 1-3 mm (particularly, the length may be 1 mm, 2 mm and 2.5 mm), the length of the gap is 1-3 mm (particularly, the length may be 1 mm, 2 mm and 3 mm), and particularly, the laser crystal 11 may be doped with $Nd^{3+}$ ion with doping concentration of 2%.

If the power of the laser module is 300-1000 mW, then the length of the laser crystal 11 is 2-3 mm (particularly, the length may be 2 mm, 2.5 mm and 3 mm), the length of the gap is 1-7 mm, (preferably 2-7, more preferably 2-5), and particularly, the laser crystal 11 may be doped with Nd3+ ion with doping concentration of 1%.

If the power of the laser module is 1000-5000 mW, then the length of the laser crystal 11 is 3-5 mm (particularly, the length may be 3 mm, 4 mm and 5 mm), the length of the gap is 5-8 mm (particularly, the length may be 6 mm, 7 mm and 8 mm), and particularly, the laser crystal 11 may be doped with $Nd^{3+}$ ion with doping concentration of 0.5%.

Particularly, the power of the laser module in all circumstances above-mentioned refers to the range of the highest output power in all circumstances.

It should be noted that, the invention is not only suitable for frequency doubling process for generating green laser (for example, second harmonic generation), but also suitable for other nonlinear optical processes (for example, sum frequency and difference frequency) and for generating laser (e.g., blue laser) of other wavelength.

The above is only the preferred embodiment of the invention and not intended to limit the invention. For those skilled in the art, various alterations and changes may be made to the invention. Any modifications, equivalent replacements, improvements and the like made within the spirit and principle of the invention shall fall within the scope of protection of the invention.

The invention claimed is:
1. A method for making a laser module, comprising:
 fixing a laser crystal and a nonlinear crystal through at least one spacing element to form a first structure;
 assembling the first structure on a substrate;
 removing the spacing element to form a first laser module; and combining a plurality of first laser modules into an array, and packaging the nonlinear crystal of each first laser module of the array in a metal holder.

2. The method according to claim 1, wherein assembling the first structure on a substrate comprises connecting the first structure to the substrate through bonding or welding.

3. The method according to claim 1, wherein the substrate is a heat conductive substrate.

4. The method according to claim 1, wherein the nonlinear crystal is magnesium oxide doped PPLN, PPLT, PPSLT, PPKTP, KTP, BBO, BIBO or LBO.

5. The method according to claim 1, wherein the nonlinear crystal is doped with magnesium oxide with molar concentration of 5%.

6. The method according to claim 1, wherein the laser crystal is neodymium doped yttrium orthovanadate, neodymium doped gadolinium orthovanadate or neodymium doped yttrium aluminium garnet.

7. The method according to claim 1, wherein the laser crystal is doped with $Nd^{3+}$ ion with doping concentration of 1-3%.

8. The method according to claim 7, wherein the doping concentration of $Nd^{3+}$ ion in the laser crystal is 1%, 2% or 3%.

9. The method according to claim 1, wherein the length of the laser crystal is 0.5-5 mm, the length of the nonlinear crystal is 0.5-5 mm, there is a gap between the laser crystal and the nonlinear crystal, and the length of the gap is 0.2-8 mm.

10. The method according to claim 1, wherein
there is a gap between the laser crystal and the nonlinear crystal;
if the power of the laser module is 100-150 mW, then the length of the laser crystal is 0.5-2 mm, the laser crystal is doped with $Nd^{3+}$ ion with doping concentration of 3%, the length of the nonlinear crystal is 0.5-5 mm, and the length of the gap is 0.2-2 mm;
if the power of the laser module is 100-500 mW, then the length of the laser crystal is 1-3 mm, the laser crystal is doped with $Nd^{3+}$ ion with doping concentration of 2%, the length of the nonlinear crystal is 0.5-5 mm, and the length of the gap is 1-3 mm;
if the power of the laser module is 300-1000 mW, then the length of the laser crystal is 2-3 mm, the laser crystal is doped with $Nd^{3+}$ ion with doping concentration of 1%, the length of the nonlinear crystal is 0.5-5 mm, and the length of the gap is 2-7 mm; and
if the power of the laser module is 1000-5000 mW, then the length of the laser crystal is 3-5 mm, the laser crystal is doped with $Nd^{3+}$ ion with doping concentration of 0.5%, the length of the nonlinear crystal is 0.5-5 mm, and the length of the gap is 3-8 mm.

11. The method according to claim 1, wherein the spacing element comprises two parallel bonded surfaces the laser crystal and the nonlinear crystal are respectively connected with one of the bonded surfaces so that the input surface and the output surface of the laser crystal and the nonlinear crystal are parallel to each other and vertical to the direction of a laser beam.

12. The method according to claim 1, wherein the array is formed by stacking each first laser module in a direction vertical to an optical axis thereof.

13. The method according to claim 1, wherein the length of the laser crystal is 0.5-5 mm, the length of the nonlinear crystal is 0.5-5 mm, there is a gap between the laser crystal and the nonlinear crystal, and the length of the gap is 0.2-8 mm.

14. The method according to claim 1, wherein fixing the laser crystal and the nonlinear crystal to form a first structure comprises connecting the spacing element to the laser crystal and/or the nonlinear crystal through optical bonding or glue bonding.

* * * * *